United States Patent
Khan et al.

(10) Patent No.: US 10,489,330 B2
(45) Date of Patent: Nov. 26, 2019

(54) ACTIVE EXTENSIBLE MEMORY HUB

(71) Applicant: Intel Corporation, Santa Clara, CA (US)

(72) Inventors: Jawad Khan, Portland, OR (US); Knut Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/191,555

(22) Filed: Nov. 15, 2018

(65) Prior Publication Data

US 2019/0087374 A1    Mar. 21, 2019

(51) Int. Cl.
| | |
|---|---|
| *G06F 13/40* | (2006.01) |
| *G06F 13/42* | (2006.01) |
| *G06F 13/16* | (2006.01) |

(52) U.S. Cl.
CPC ...... *G06F 13/4022* (2013.01); *G06F 13/1673* (2013.01); *G06F 13/1689* (2013.01); *G06F 13/1694* (2013.01); *G06F 13/4045* (2013.01); *G06F 13/4234* (2013.01)

(58) Field of Classification Search
CPC .. G06F 13/16; G06F 13/1657; G06F 13/1668; G06F 13/1684; G06F 13/1689; G06F 13/1694; G06F 13/4004; G06F 13/4022; G06F 13/4027; G06F 13/4045; G06F 13/405; G06F 13/4234; G06F 13/4247; G06F 13/4256; G06F 13/4265; G06F 13/4273; G06F 3/0601; G06F 3/0602; G06F 3/0671; G06F 3/0683; G06F 3/0688; G06F 2003/0691
See application file for complete search history.

(56) References Cited

U.S. PATENT DOCUMENTS

| | | | |
|---|---|---|---|
| 9,396,065 B2 | 7/2016 | Webb et al. | |
| 2006/0047891 A1* | 3/2006 | James | G06F 13/1642 711/105 |
| 2007/0252230 A1* | 11/2007 | Zhu | H01L 21/823807 257/499 |
| 2009/0006790 A1* | 1/2009 | Bartley | G06F 13/1684 711/157 |
| 2010/0005214 A1* | 1/2010 | Trombley | G06F 13/405 710/310 |
| 2010/0005218 A1* | 1/2010 | Gower | G06F 13/4234 711/5 |
| 2015/0255130 A1* | 9/2015 | Lee | G06F 13/382 711/103 |

* cited by examiner

*Primary Examiner* — Thomas J. Cleary
(74) *Attorney, Agent, or Firm* — Jordan IP Law, LLC

(57) ABSTRACT

An embodiment of an extensible memory hub may include one or more upstream interface ports to couple the extensible memory hub to the controller, one or more downstream interface ports to couple the extensible memory hub to one or more of the nonvolatile memory and another extensible memory hub, and a clock circuit to provide a first clock signal at a first frequency to the one or more upstream interface ports and a second clock signal at a second frequency to the one or more downstream interface ports, where the first frequency may be different from the second frequency. Other embodiments are disclosed and claimed.

17 Claims, 7 Drawing Sheets

ACTIVE EXTENSIBLE MEMORY HUB

TECHNICAL FIELD

Embodiments generally relate to memory and storage systems. More particularly, embodiments relate to an active extensible memory hub.

BACKGROUND

Some memory/storage systems may include an extensible memory hub. An apparatus may include a first extensible non-volatile memory (NVM) hub (EN hub). The first EN hub includes an upstream interface port configured to couple the first EN hub to an NVM controller or to a second EN hub, a downstream interface port configured to couple the first EN hub to a third EN hub or to a NVM device, at least one NVM device port, each NVM device port configured to couple the first EN hub to a respective NVM device via a NVM channel, and an EN hub controller. The EN hub controller includes command logic configured to initialize the first EN hub in response to an initialize chain command from the NVM controller, the initializing including enumerating each NVM device coupled to the first EN hub and each of one or more associated NVM dies.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place NVM devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
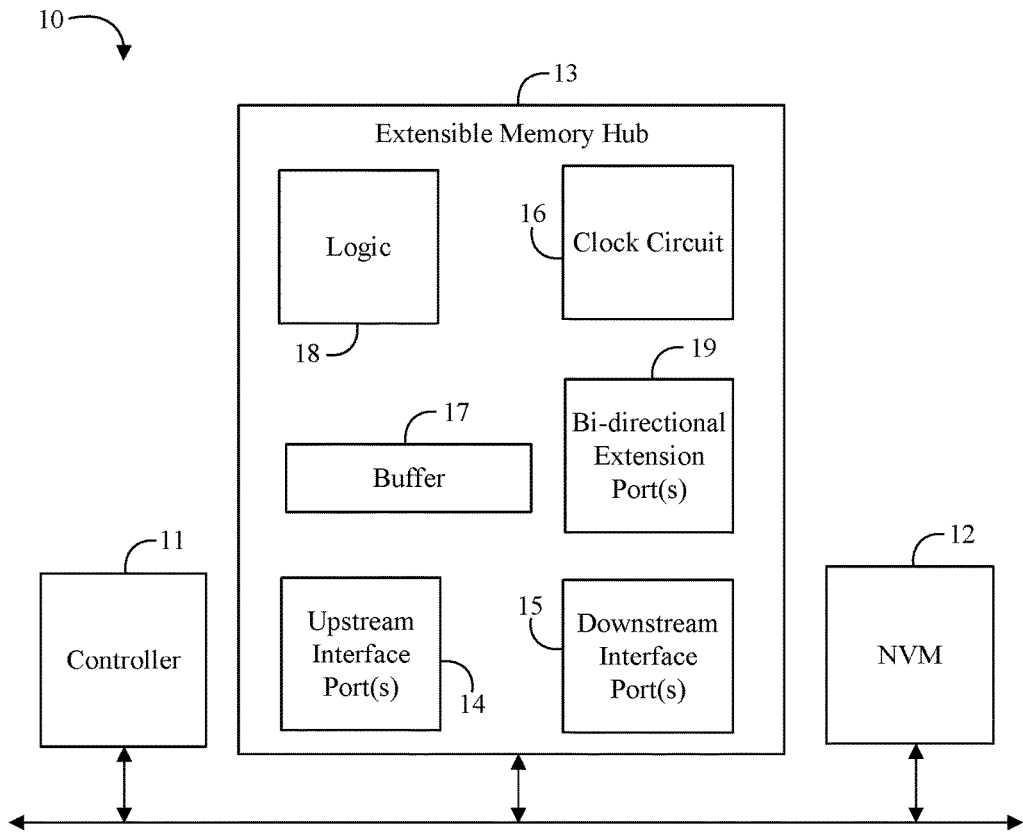
FIG. 1 is a block diagram of an example of an electronic memory system according to an embodiment.

Turning now to FIG. 1, an embodiment of an electronic memory system 10 may include a controller 11, NVM 12, and an extensible memory hub 13 communicatively coupled to the controller 11 and the NVM 12. The extensible memory hub 13 may include one or more upstream interface ports 14 to couple the extensible memory hub 13 to the controller 11, one or more downstream interface ports 15 to couple the extensible memory hub 13 to one or more of the NVM 12 and another extensible memory hub, and a clock circuit 16 to provide a first clock signal at a first frequency to the one or more upstream interface ports 14 and a second clock signal at a second frequency to the one or more downstream interface ports 15, where the first frequency may be different from the second frequency. In some embodiments, the extensible memory hub 13 may further include a buffer 17, and logic 18 to actively manage the buffer 17 for data transfer between the one or more upstream interface ports 14 and the one or more downstream interface ports 15. The extensible memory hub 13 may also optionally include one or more bi-directional extension ports 19 to couple the extensible memory hub 13 to one or more of another extensible memory hub and a second NVM device. For example, the logic 18 may be further configured to actively manage the buffer 17 for data transfer between the one or more bi-directional extension ports 19, the one or more upstream interface ports 14, and the one or more downstream interface ports 15.

In some embodiments, the logic 18 may be further configured to chain multiple extensible memory hubs with the one or more bi-directional extension ports 19, and/or to provide dual port access to the second NVM device with the one or more bi-directional extension ports 19. For example, the clock circuit 16 may be further configured to provide a third clock signal at a third frequency to the one or more bi-directional extension ports 19, where the third frequency may be different from one or more of the first frequency and the second frequency. In any of the embodiments herein, the NVM 12 may comprise a solid state drive (SSD). In some embodiments, the NVM 12, the extensible memory hub 13, upstream interface port(s) 14, downstream interface port(s) 15, clock circuit 16, buffer 17, logic 18, and/or the bi-directional extension port(s) 19 may be located in, or co-located with, various components, including the controller 11 (e.g., on a same die).

Embodiments of each of the above controller 11, NVM 12, extensible memory hub 13, upstream interface port(s) 14, downstream interface port(s) 15, clock circuit 16, buffer 17, logic 18, bi-directional extension port(s) 19, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the NVM 12, volatile memory, persistent storage media, or other system memory may store a set of instructions which when executed by the controller 11 cause the system 10 to implement one or more components, features, or aspects of the system 10 (e.g., the logic 18, actively managing the buffer 17 for data transfer between the various ports, setting the various clock frequencies, chaining, multiple extensible memory hubs, etc.).

Figure 2:
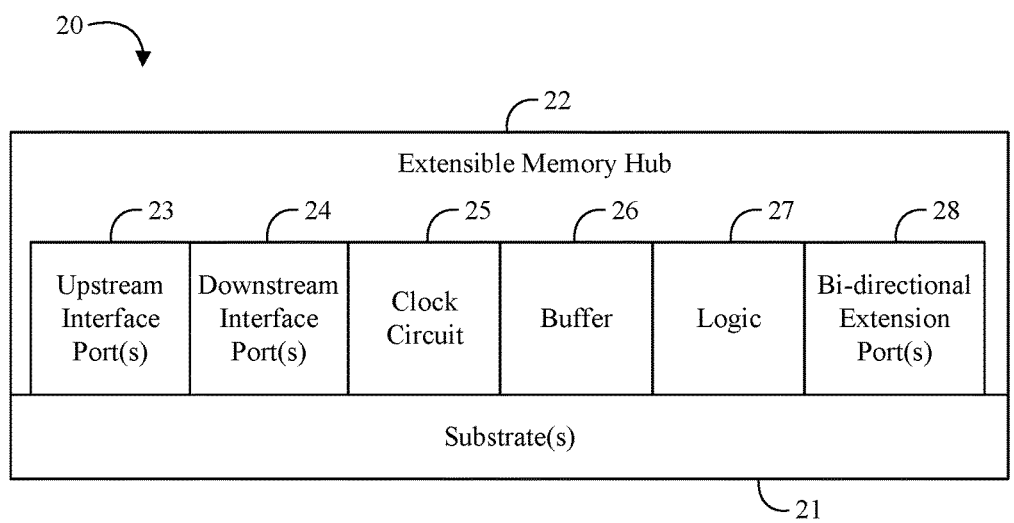
FIG. 2 is a block diagram of an example of a semiconductor apparatus according to an embodiment.

Turning now to FIG. 2, an embodiment of a semiconductor apparatus 20 may include one or more substrates 21, and an extensible memory hub 22 coupled to the one or more substrates 21. The extensible memory hub 22 may include one or more upstream interface ports 23 to couple the extensible memory hub 22 to a controller, one or more downstream interface ports 24 to couple the extensible memory hub 22 to one or more of NVM and another extensible memory hub, and a clock circuit 25 to provide a first clock signal at a first frequency to the one or more upstream interface ports 23 and a second clock signal at a second frequency to the one or more downstream interface ports 24, where the first frequency may be set to be different from the second frequency. Some embodiments of the extensible memory hub 22 may further include a buffer 26 coupled to the one or more substrates 21, and logic 27 coupled to the one or more substrates 21, where the logic 27 is at least partly implemented in one or more of configurable logic and fixed-functionality hardware logic. The logic 27 coupled to the one or more substrates 21 may be configured to actively manage the buffer 26 for data transfer between the one or more upstream interface ports 23 and the one or more downstream interface ports 24. In some embodiments, the extensible memory hub 22 may optionally further include one or more bi-directional extension ports 28 to couple the extensible memory hub 22 to one or more of another extensible memory hub and a second NVM device. For example, the logic 27 may be further configured to actively manage the buffer 26 for data transfer between the one or more bi-directional extension ports 28, the one or more upstream interface ports 23, and the one or more downstream interface ports 24.

Some embodiments of the logic 27 may be further configured to chain multiple extensible memory hubs with the one or more bi-directional extension ports 28, and/or to provide dual port access to the second NVM device with the one or more bi-directional extension ports 28. For example, the clock circuit 25 may be further configured to provide a third clock signal at a third frequency to the one or more bi-directional extension ports 28, where the third frequency may be different from one or more of the first frequency and the second frequency. In some embodiments, the logic 27 coupled to the one or more substrates 21 may include transistor channel regions that are positioned within the one or more substrates 21. In any of the embodiments herein, the NVM may comprise a SSD, and the apparatus 20 may be incorporated in housing/enclosure of a SSD device.

Embodiments of the extensible memory hub 22, upstream interface port(s) 23, downstream interface port(s) 24, clock circuit 25, buffer 26, logic 27, bi-directional extension port(s) 28, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 27 (e.g., transistor array and other integrated circuit/IC components) coupled to the substrate(s) 21. The logic 27 may be implemented at least partly in configurable logic or fixed-functionality logic hardware. In one example, the logic 27 may include transistor channel regions that are positioned (e.g., embedded) within the substrate(s) 21. Thus, the interface between the logic 27 and the substrate(s) 21 may not be an abrupt junction. The logic 27 may also be considered to include an epitaxial layer that is grown on an initial wafer of the substrate(s) 21.

Figure 3A:
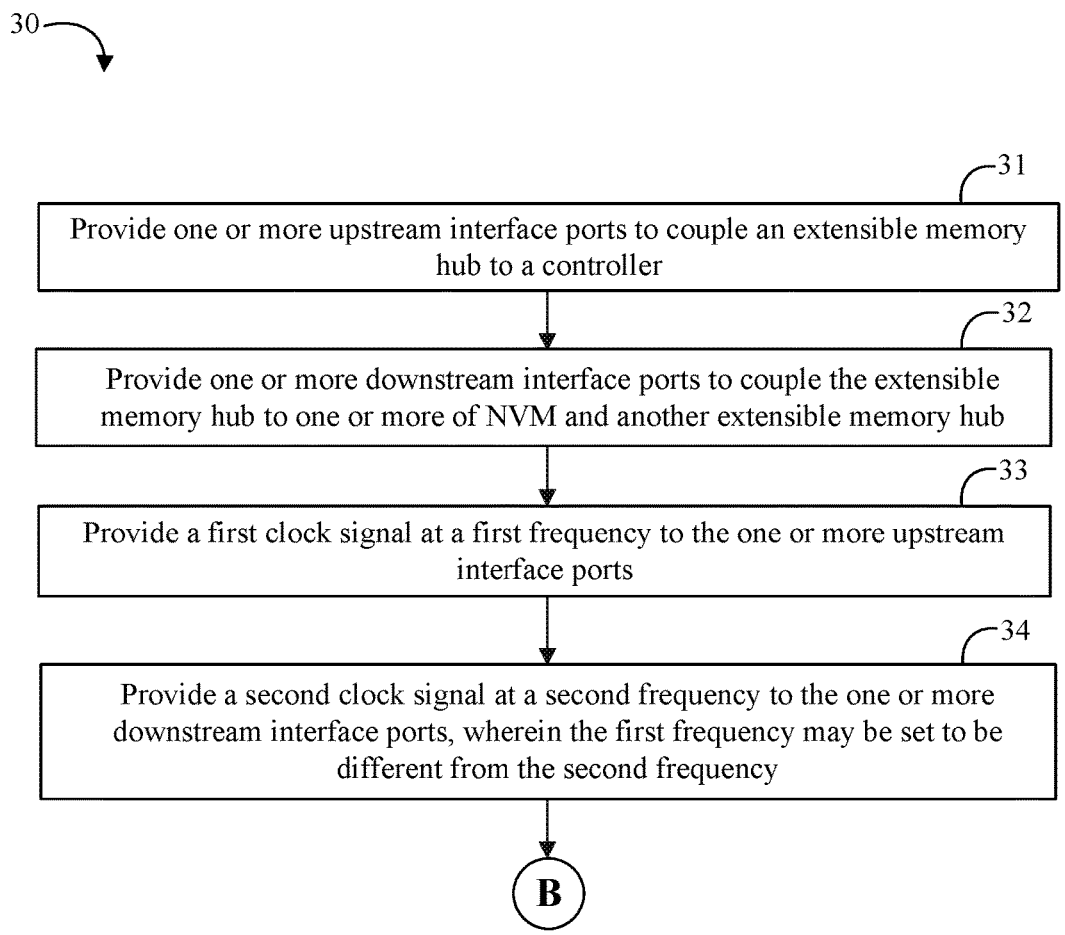
FIGS. 3A to 3C are flowcharts of an example of a method of extending memory according to an embodiment.
Figure 3B:
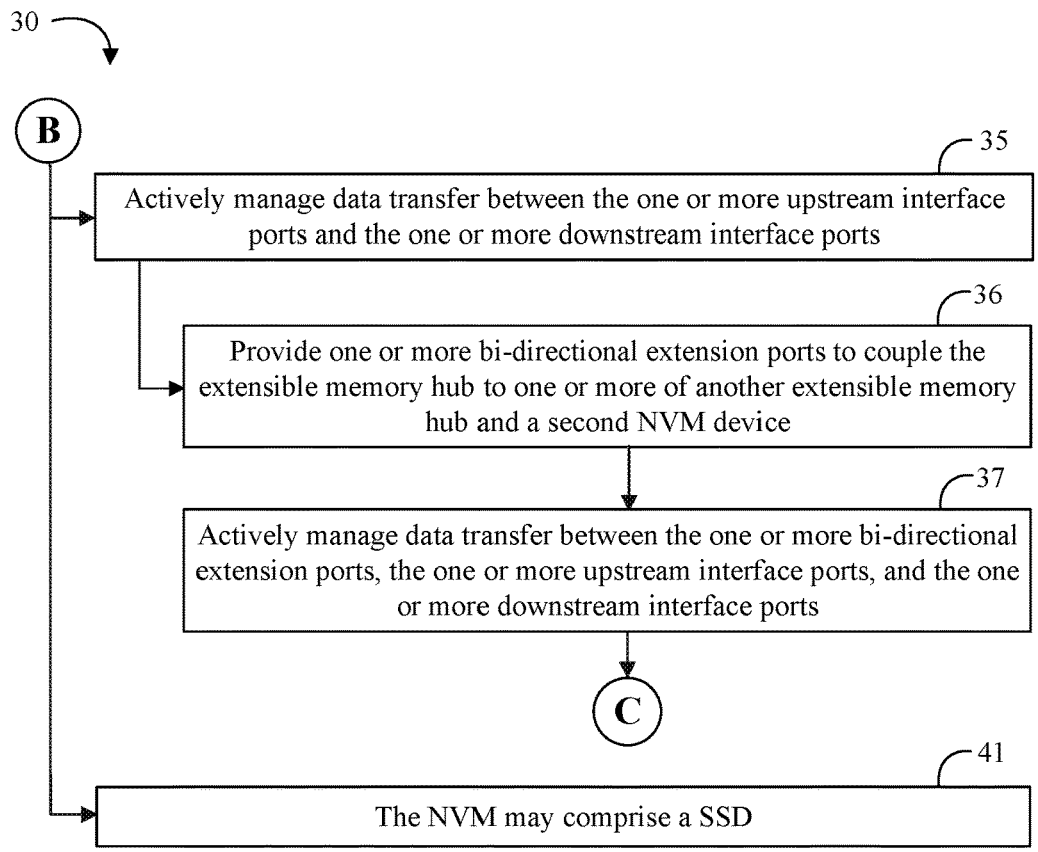
Figure 3C:
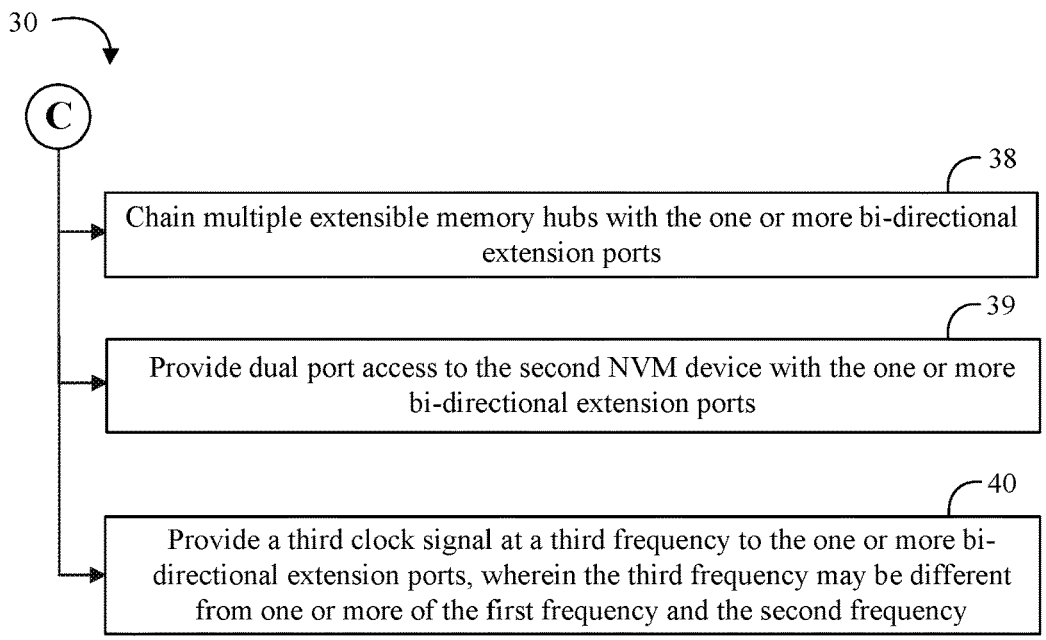

Turning now to FIGS. 3A to 3C, an embodiment of a method 30 of extending memory may include providing one or more upstream interface ports to couple an extensible memory hub to a controller at block 31, providing one or more downstream interface ports to couple the extensible memory hub to one or more of NVM and another extensible memory hub at block 32, providing a first clock signal at a first frequency to the one or more upstream interface ports at block 33, and providing a second clock signal at a second frequency to the one or more downstream interface ports, where the first frequency may be set to be different from the second frequency, at block 34. Some embodiments of the method 30 may further include actively managing data transfer between the one or more upstream interface ports and the one or more downstream interface ports at block 35. For example, the method 30 may also include providing one or more bi-directional extension ports to couple the extensible memory hub to one or more of another extensible memory hub and a second NVM device at block 36, and actively managing data transfer between the one or more bi-directional extension ports, the one or more upstream interface ports, and the one or more downstream interface ports at block 37.

Some embodiments of the method 30 may further include chaining multiple extensible memory hubs with the one or more bi-directional extension ports at block 38, and/or providing dual port access to the second NVM device with the one or more bi-directional extension ports at block 39. For example, the method 30 may also include providing a third clock signal at a third frequency to the one or more bi-directional extension ports, where the third frequency may be different from one or more of the first frequency and the second frequency at block 40. In any of the embodiments herein, the NVM may comprise a SSD at block 41.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 22 to 28 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for a multi-port active NAND memory hub. An extensible NAND hub may include technology to increase the NAND capacity in an SSD without lowering performance, increasing power or requiring more channels from an SSD controller. In some other systems, the extensible memory hub may have both upstream and downstream ports running at the same frequency. With increasing performance of the host interface, however, a large number of NAND channels may be needed to support higher Peripheral Component Interconnect Express (PCIe) interface speeds, and the number of channels needed to saturate the interface may become so large that the number of pins may undesirably increase the SSD controller die area. Some embodiments may advantageously support a higher performance interface while maintaining a lower pin count for the interface.

In general, SSD controllers may provide a large number of channels to attach NAND devices as needed for performance and/or capacity. Beyond a certain minimum number of channels needed for the desired performance, more channels may be needed to provide increasing capacity points. A significant issue with the high capacity SSDs is that the electrical loading on the controller channel is increased, which in turn decreases the signal integrity, and the channel frequency and the overall SSD performance suffers. IO power is also increased in the process because of the larger load. For ever increasing SSD capacities and performance, a conventional approach may keep on increasing the number of channels on the SSD controller. More channels on an SSD controller translate to more pins and die area, however, and consequently the cost increases. A conventional extensible memory hub may increase SSD capacity without adding more channels, but may become less effective for higher performance interfaces.

Some embodiments may advantageously provide active extensible memory hub technology to run upstream and downstream ports at different frequencies, and to provide active data buffering capability within the extensible memory hub itself. For example, embodiments of active data buffering technology may allow a host to run a different data rate than the downstream NAND devices. Some embodiments may advantageously increase SSD capacity and performance without increasing the number of channels on the controller. Some embodiments may also include bi-directional extension port technology, within the extensible memory hub itself, which can be used to chain extensible memory hubs together. Because of the active nature of the extensible memory hub, some embodiments may also enable dual-port access to NAND devices.

In some embodiments, an active extensible memory hub may include one or more dedicated upstream port(s) to the controller, and one or more downstream port(s) to another active extensible memory hub or a NAND device. For example, some embodiments may include four or more dedicated NAND ports, depending upon whether the active extensible memory hub is implemented as a discrete component or is embedded in the NAND package itself. Some embodiments may also include a bi-directional extension port. In addition to conventional extensible memory hub command logic, the active extensible memory hub may include further command logic to run the upstream, downstream, and/or bi-directional ports at different frequencies and to provide buffering capability within the active extensible memory hub itself. The further command logic may also be configured to utilize the bi-directional extension port to chain active extensible memory hubs and/or to provide dual-port access to NAND devices (e.g., using the bi-directional nature of the extension port).

Figure 4:
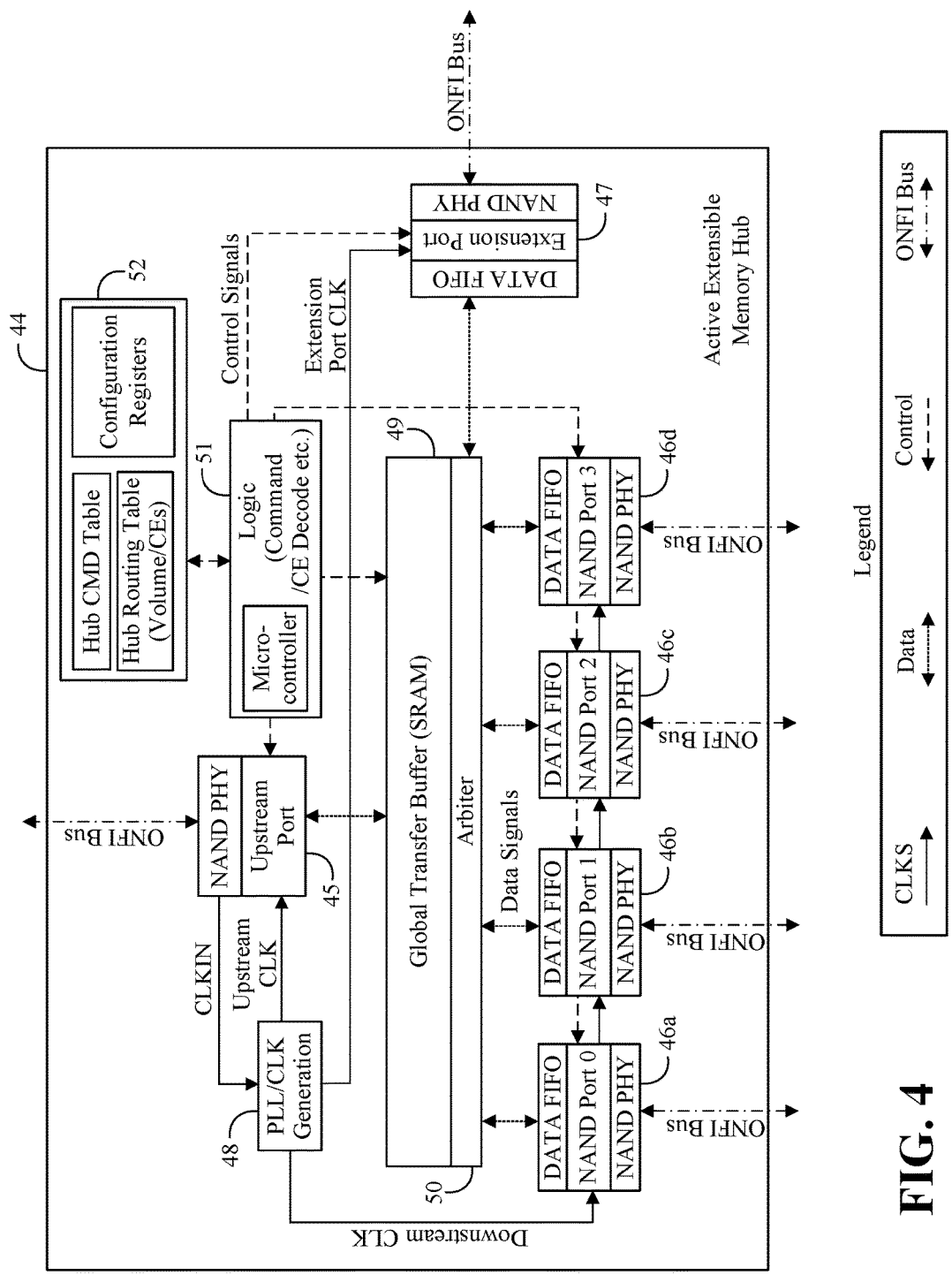
FIG. 4 is a block diagram of an example of an active extensible memory hub according to an embodiment.

Turning now to FIG. 4, an embodiment of an active extensible memory hub 44 includes an upstream port 45, four downstream ports 46a to 46d (collectively "46"), an extension port 47, and a clock circuit 48 to provide an upstream clock signal to the upstream port 45, a downstream clock signal to the downstream ports 46, and an extension port clock signal to the extension port 47. For example, the clock circuit 48 includes phase lock loop (PLL) technology to generate the upstream clock signal, the downstream clock signal, and the extension port clock signal from an input clock signal. Each of the ports 45, 46, and 47 may include appropriate interface technology (e.g., NAND PHY) to operate with one or more interfaces including, for example, the Open NAND Flash Interface (ONFI). The downstream ports 46 and the extension port 47 may also include local buffering technology (e.g., a data first-in-first-out (FIFO) buffer). For example, the upstream port 45 may be coupled to a NAND controller channel, each of the downstream ports may be respectively coupled to another active extensible memory hub or a NAND device, and the extension port 47 may also be coupled to another active extensible memory hub or a NAND device.

Within the active extensible memory hub 44, each of the ports 45, 46, and 47 are coupled to a global transfer buffer 49 (e.g., implemented in SRAM or other suitable memory technology), which may include an arbiter 50 coupled to the data FIFOs of the downstream ports 46 and the extension port 47. The active extensible memory hub 44 further includes logic 51 and memory 52 to support the operation of the active extensible memory hub 44. The logic 51 may be coupled to the memory 52, the ports 45, 46, and 47, the clock circuit 48 (not shown), and/or the buffer 49. For example, the logic 51 may include a microcontroller and/or appropriate command logic to perform commands, chip enable (CE) decode, etc., and to send appropriate control signals to the various components of the active extensible memory hub 44 (e.g., to implement one or more aspects or features of the embodiments described herein). For example, the memory 52 may store a hub command table, a hub routing table (e.g., volume/CEs, etc.), and configuration registers.

The active extensible memory hub 44 may implement a store and forward architecture for NAND commands and data for downstream ports 46a, 46b etc. The commands and data coming from the host port may be stored temporarily in the global transfer buffer 49 and then later sent to the downstream NAND ports (46a, 46b, etc.). The downstream NAND ports (46a, 46b, etc.) may then re-create the NAND command protocol which may be sent over the ONFI bus. The extension port 47 may be configured by the logic 51 to be an output port or an input port. The hub routing table 52 may be used to route the commands coming from the host to the appropriate port. For example, the appropriate port may be on the active extensible memory hub 44 itself or on a downstream active extensible memory hub device (e.g., connected via the extension port 47).

Advantageously, some embodiments may provide a specific capacity and performance level of a SSD to be attained for a lower pin count controller, with lower power, as compared to a conventional controller with more channels (e.g., and more pins). Conversely, some embodiments may advantageously increase the performance for a given cost and power level. Because the active extensible memory hub supports flexible memory arrangements, some embodiments may avoid big upfront costs and may enable a user/administrator to increase memory performance/capacity as needed at a later time.

Figure 5:
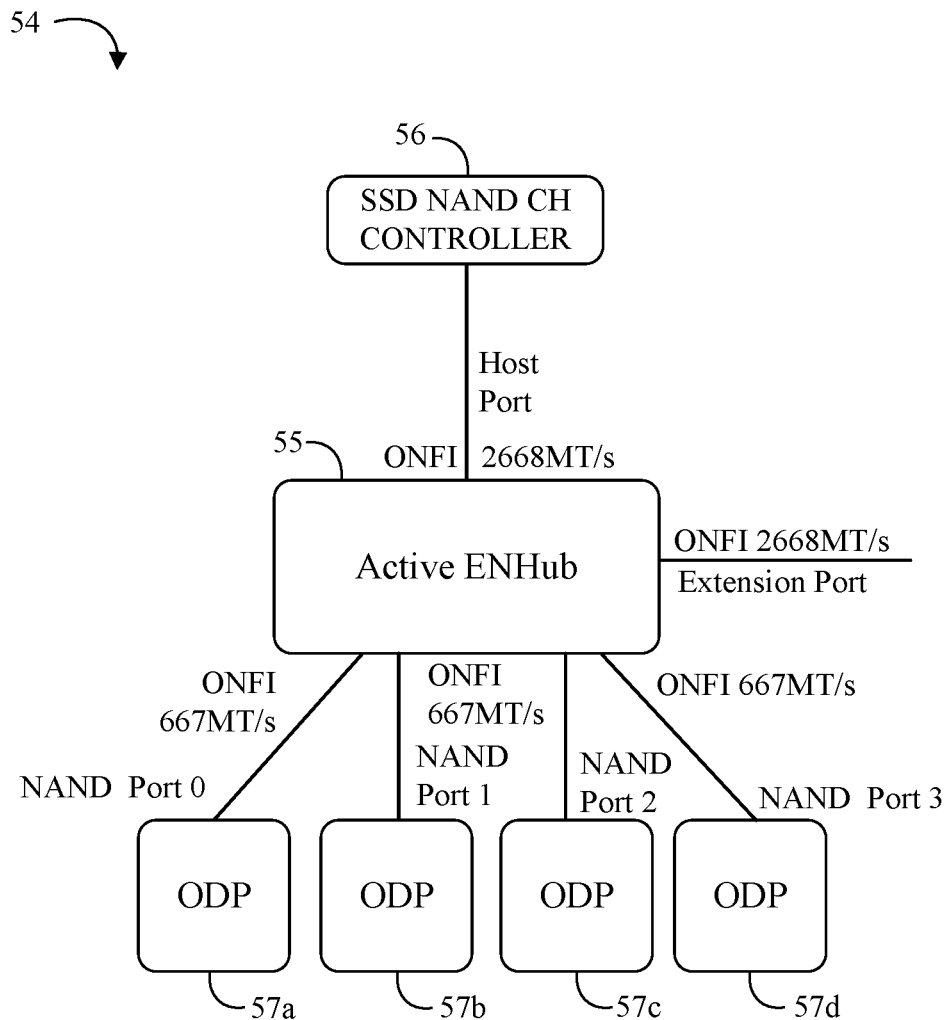
FIG. 5 is a block diagram of another example of an electronic memory system according to an embodiment.

Turning now to FIG. 5, an embodiment of an electronic memory system 54 may include an active extensible NAND hub (ENHub) 55 with a host port coupled to a SSD NAND channel controller 56 and four NAND ports 0 to 3 respectively coupled to four octal die packages (ODPs) 57a to 57d (collectively "57"). The host port can run at a higher frequency than the downstream NAND ports (0-3). For example, the ENHub 55 may include a ONFI-compatible host port running at 2668 mega transfers per second (MT/s) coupled to the SSD NAND channel controller 56, and four ONFI-compatible NAND ports 0 to 3 running at 667 MT/s coupled to the ODPs 57. An optional extension port may also be provided for further capacity increase if needed. For example, the extension port may also be ONFI-compatible and may run at the same frequency as the host port (e.g., 2668 MT/s). As described in detail herein, the active ENHub 55 may include data buffering technology and may allow for active regeneration of the ONFI protocol on the downstream NAND ports. Embodiments of ENHub components may be implemented in discrete form or may be packaged together with other components (e.g., NAND dies).

Figure 6:
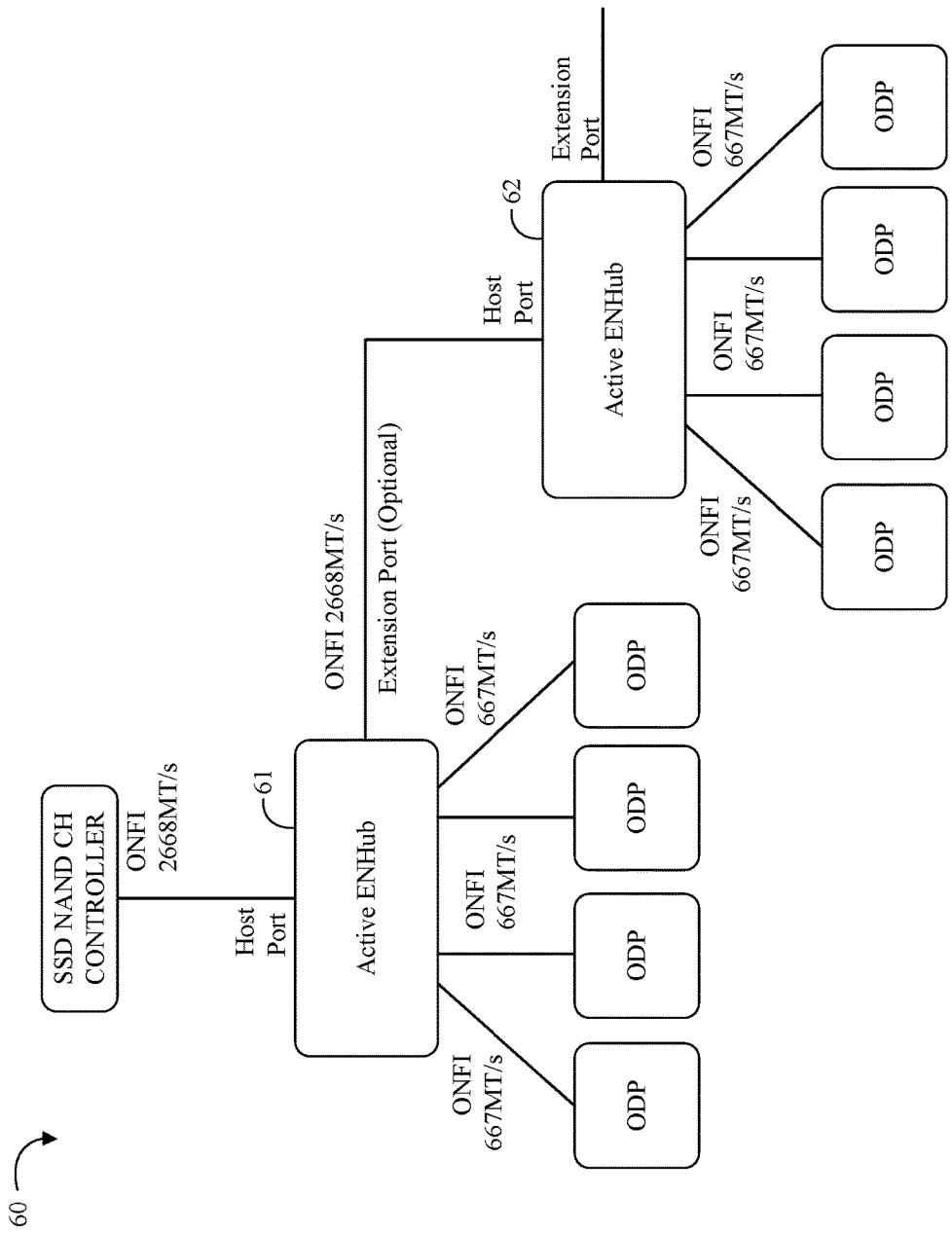
FIG. 6 is a block diagram of another example of an electronic memory system according to an embodiment.

Turning now to FIG. 6, an embodiment of an electronic memory system 60 may include two active ENHub components 61, 62 chained together with the extension port of the active ENHub 61 for a higher capacity memory/storage application.

Figure 7:
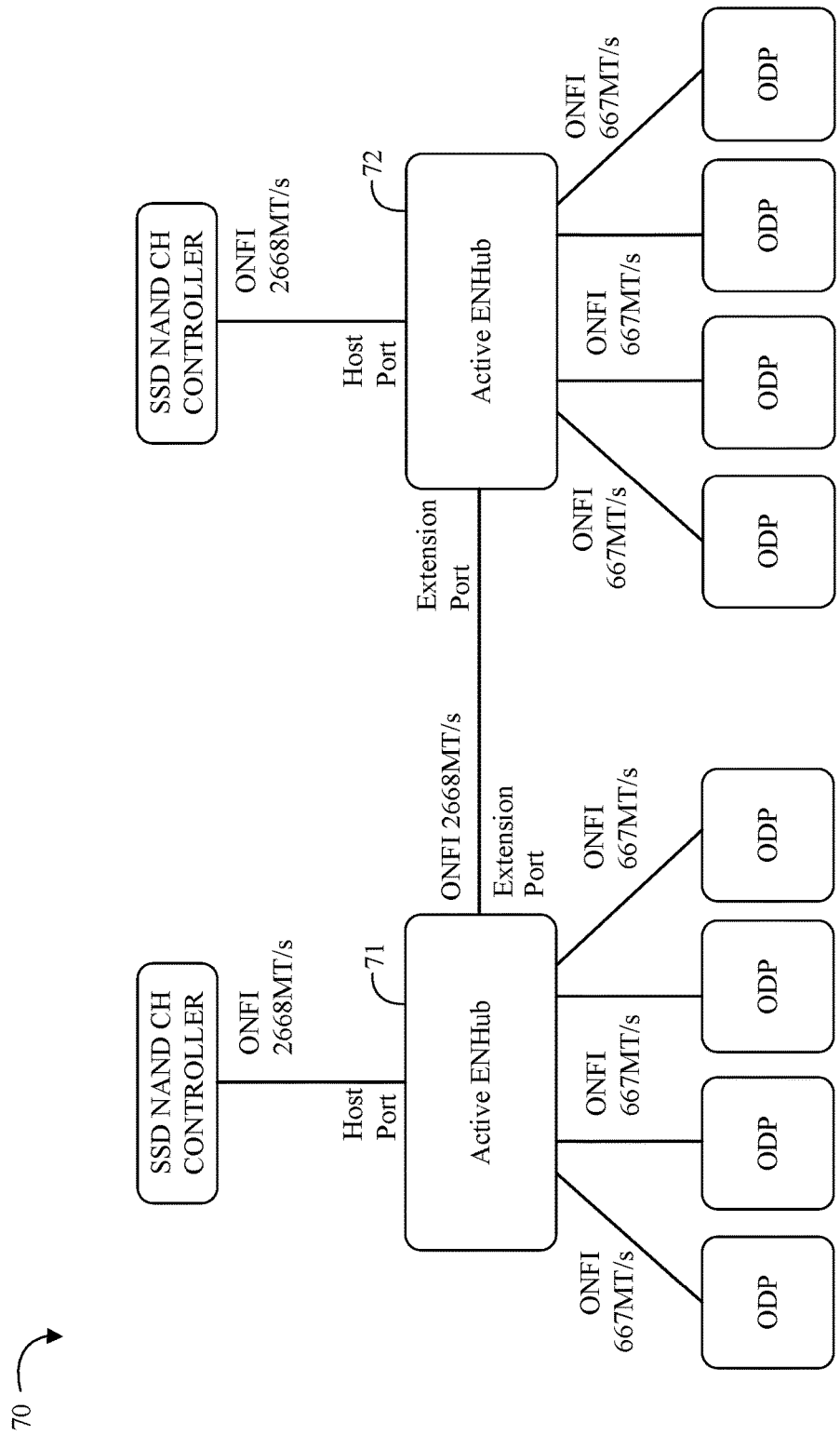
FIG. 7 is a block diagram of another example of an electronic memory system according to an embodiment.

Turning now to FIG. 7, an embodiment of an electronic memory system 70 may include two active ENHub components 71, 72 in a dual port arrangement. Each of the ENHub components 71, 72 may be coupled to respective SSD NAND channel controllers. The dual port arrangement provides connectivity to the NAND devices (e.g., ODPs) through two different NAND channels via the extension port.

Additional Notes And Examples

Example 1 includes a semiconductor apparatus, comprising one or more substrates, and an extensible memory hub coupled to the one or more substrates, the extensible memory hub including one or more upstream interface ports to couple the extensible memory hub to a controller, one or more downstream interface ports to couple the extensible memory hub to one or more of nonvolatile memory and another extensible memory hub, and a clock circuit to provide a first clock signal at a first frequency to the one or more upstream interface ports and a second clock signal at a second frequency to the one or more downstream interface ports, wherein the first frequency may be set to be different from the second frequency.

Example 2 includes the apparatus of Example 1, wherein the extensible memory hub further comprises a buffer coupled to the one or more substrates, and logic coupled to the one or more substrates, wherein the logic is at least partly implemented in one or more of configurable logic and fixed-functionality hardware logic, the logic coupled to the one or more substrates to actively manage the buffer for data transfer between the one or more upstream interface ports and the one or more downstream interface ports.

Example 3 includes the apparatus of Example 2, wherein the extensible memory hub further comprises one or more bi-directional extension ports to couple the extensible memory hub to one or more of another extensible memory hub and a second nonvolatile memory device, wherein the logic is further to actively manage the buffer for data transfer between the one or more bi-directional extension ports, the one or more upstream interface ports, and the one or more downstream interface ports.

Example 4 includes the apparatus of Example 3, wherein the logic is further to chain multiple extensible memory hubs with the one or more bi-directional extension ports.

Example 5 includes the apparatus of any of Examples 3 to 4, wherein the logic is further to provide dual port access to the second nonvolatile memory device with the one or more bi-directional extension ports.

Example 6 includes the apparatus of any of Examples 3 to 5, wherein the clock circuit is further to provide a third clock signal at a third frequency to the one or more bi-directional extension ports, wherein the third frequency may be different from one or more of the first frequency and the second frequency.

Example 7 includes the apparatus of Example any of Examples 3 to 6, wherein the logic coupled to the one or more substrates includes transistor channel regions that are positioned within the one or more substrates.

Example 8 includes an electronic memory system, comprising a controller, nonvolatile memory, and an extensible memory hub communicatively coupled to the controller and the nonvolatile memory, the extensible memory hub including one or more upstream interface ports to couple the extensible memory hub to the controller, one or more downstream interface ports to couple the extensible memory hub to one or more of the nonvolatile memory and another extensible memory hub, and a clock circuit to provide a first clock signal at a first frequency to the one or more upstream interface ports and a second clock signal at a second frequency to the one or more downstream interface ports, wherein the first frequency may be different from the second frequency.

Example 9 includes the system of Example 8, wherein the extensible memory hub further comprises a buffer, and logic to actively manage the buffer for data transfer between the one or more upstream interface ports and the one or more downstream interface ports.

Example 10 includes the system of Example 9, wherein the extensible memory hub further comprises one or more bi-directional extension ports to couple the extensible memory hub to one or more of another extensible memory hub and a second nonvolatile memory device, wherein the logic is further to actively manage the buffer for data transfer between the one or more bi-directional extension ports, the one or more upstream interface ports, and the one or more downstream interface ports.

Example 11 includes the system of Example 10, wherein the logic is further to chain multiple extensible memory hubs with the one or more bi-directional extension ports.

Example 12 includes the system of any of Examples 10 to 11, wherein the logic is further to provide dual port access to the second nonvolatile memory device with the one or more bi-directional extension ports.

Example 13 includes the system of any of Examples 10 to 12, wherein the clock circuit is further to provide a third clock signal at a third frequency to the one or more bi-directional extension ports, wherein the third frequency may be different from one or more of the first frequency and the second frequency.

Example 14 includes the system of any of Examples 8 to 13, wherein the nonvolatile memory comprises a solid state drive.

Example 15 includes a method of extending memory, comprising providing one or more upstream interface ports to couple an extensible memory hub to a controller, providing one or more downstream interface ports to couple the extensible memory hub to one or more of nonvolatile memory and another extensible memory hub, providing a first clock signal at a first frequency to the one or more upstream interface ports, and providing a second clock signal at a second frequency to the one or more downstream interface ports, wherein the first frequency may be set to be different from the second frequency.

Example 16 includes the method of Example 15, further comprising actively managing data transfer between the one or more upstream interface ports and the one or more downstream interface ports.

Example 17 includes the method of Example 16, further comprising providing one or more bi-directional extension ports to couple the extensible memory hub to one or more of another extensible memory hub and a second nonvolatile memory device, and actively managing data transfer between the one or more bi-directional extension ports, the one or more upstream interface ports, and the one or more downstream interface ports.

Example 18 includes the method of Example 17, further comprising chaining multiple extensible memory hubs with the one or more bi-directional extension ports.

Example 19 includes the method of any of Examples 17 to 18, further comprising providing dual port access to the second nonvolatile memory device with the one or more bi-directional extension ports.

Example 20 includes the method of any of Examples 17 to 19, further comprising providing a third clock signal at a third frequency to the one or more bi-directional extension ports, wherein the third frequency may be different from one or more of the first frequency and the second frequency.

Example 21 includes the method of any of Examples 15 to 20, wherein the nonvolatile memory comprises a solid state drive.

Example 22 includes at least one computer readable storage medium, comprising a set of instructions, which when executed by a computing device, cause the computing device to providing one or more upstream interface ports to couple an extensible memory hub to a controller, providing one or more downstream interface ports to couple the extensible memory hub to one or more of nonvolatile memory and another extensible memory hub, providing a first clock signal at a first frequency to the one or more upstream interface ports, and providing a second clock signal at a second frequency to the one or more downstream interface ports, wherein the first frequency may be set to be different from the second frequency.

Example 23 includes the at least one computer readable storage medium of Example 22, comprising a further set of instructions, which when executed by the computing device, cause the computing device to actively managing data transfer between the one or more upstream interface ports and the one or more downstream interface ports.

Example 24 includes the at least one computer readable storage medium of Example 23, comprising a further set of instructions, which when executed by the computing device, cause the computing device to providing one or more bi-directional extension ports to couple the extensible memory hub to one or more of another extensible memory hub and a second nonvolatile memory device, and actively managing data transfer between the one or more bi-directional extension ports, the one or more upstream interface ports, and the one or more downstream interface ports.

Example 25 includes the at least one computer readable storage medium of Example 24, comprising a further set of instructions, which when executed by the computing device, cause the computing device to chaining multiple extensible memory hubs with the one or more bi-directional extension ports.

Example 26 includes the at least one computer readable storage medium of any of Examples 24 to 25, comprising a further set of instructions, which when executed by the computing device, cause the computing device to providing dual port access to the second nonvolatile memory device with the one or more bi-directional extension ports.

Example 27 includes the at least one computer readable storage medium of any of Examples 24 to 26, comprising a further set of instructions, which when executed by the computing device, cause the computing device to providing a third clock signal at a third frequency to the one or more bi-directional extension ports, wherein the third frequency may be different from one or more of the first frequency and the second frequency.

Example 28 includes the at least one computer readable storage medium of any of Examples 22 to 27, wherein the nonvolatile memory comprises a solid state drive.

Example 29 includes an extensible memory apparatus, comprising means for providing one or more upstream interface ports to couple an extensible memory hub to a controller, means for providing one or more downstream interface ports to couple the extensible memory hub to one or more of nonvolatile memory and another extensible memory hub, means for providing a first clock signal at a first frequency to the one or more upstream interface ports, and means for providing a second clock signal at a second frequency to the one or more downstream interface ports, wherein the first frequency may be set to be different from the second frequency.

Example 30 includes the apparatus of Example 29, further comprising means for actively managing data transfer between the one or more upstream interface ports and the one or more downstream interface ports.

Example 31 includes the apparatus of Example 30, further comprising means for providing one or more bi-directional extension ports to couple the extensible memory hub to one or more of another extensible memory hub and a second nonvolatile memory device, and means for actively managing data transfer between the one or more bi-directional extension ports, the one or more upstream interface ports, and the one or more downstream interface ports.

Example 32 includes the apparatus of Example 31, further comprising means for chaining multiple extensible memory hubs with the one or more bi-directional extension ports.

Example 33 includes the apparatus of any of Examples 31 to 32, further comprising means for providing dual port access to the second nonvolatile memory device with the one or more bi-directional extension ports.

Example 34 includes the apparatus of any of Examples 31 to 33, further comprising means for providing a third clock signal at a third frequency to the one or more bi-directional extension ports, wherein the third frequency may be different from one or more of the first frequency and the second frequency.

Example 35 includes the apparatus of any of Examples 29 to 34, wherein the nonvolatile memory comprises a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus, comprising:
one or more substrates; and
a first extensible memory hub coupled to the one or more substrates, the first extensible memory hub including:
one or more upstream interface ports to couple the first extensible memory hub to a controller, one or more downstream interface ports to couple the first extensible memory hub to one or more of nonvolatile memory or another extensible memory hub, one or more bi-directional extension ports to be selectively configured to operate as an output port and an input port, the one or more bi-directional extension ports further being selectively configured to couple to another extensible memory hub and a second nonvolatile memory device, and a clock circuit to provide a first clock signal at a first frequency to the one or more upstream interface ports to cause the one or more upstream interface ports to operate at the first frequency, provide a second clock signal at a second frequency to the one or more downstream interface ports to cause the one or more downstream interface ports to operate at the second frequency, and provide a third clock signal at a third frequency to the one or more bi-directional extension ports to cause the one or more bi-directional extension ports to operate at the third frequency, wherein the first, second and third frequencies are to be different from each other.

2. The apparatus of claim 1, wherein the first extensible memory hub further comprises:

a buffer coupled to the one or more substrates; and logic coupled to the one or more substrates, wherein the logic is at least partly implemented in one or more of configurable logic or fixed-functionality hardware logic, the logic coupled to the one or more substrates to actively manage the buffer for data transfer between the one or more upstream interface ports and the one or more downstream interface ports.

3. The apparatus of claim 2, wherein the logic is further to actively manage the buffer for data transfer between the one or more bi-directional extension ports, the one or more upstream interface ports, and the one or more downstream interface ports.

4. The apparatus of claim 3, wherein the logic is further to:

chain multiple extensible memory hubs with the one or more bi-directional extension ports.

5. The apparatus of claim 3, wherein the logic is further to:

provide dual port access to the second nonvolatile memory device with the one or more bi-directional extension ports.

6. The apparatus of claim 3, wherein the logic coupled to the one or more substrates includes transistor channel regions that are positioned within the one or more substrates.

7. An electronic memory system, comprising:

a controller;

nonvolatile memory; and a first extensible memory hub communicatively coupled to the controller and the nonvolatile memory, the first extensible memory hub including:

one or more upstream interface ports to couple the first extensible memory hub to the controller, one or more downstream interface ports to couple the first extensible memory hub to one or more of the nonvolatile memory or another extensible memory hub, one or more bi-directional extension ports to be selectively configured to operate as an output port and an input port, the one or more bi-directional extension ports further being selectively configured to couple to another extensible memory hub and a second nonvolatile memory device, and a clock circuit to provide a first clock signal at a first frequency to the one or more upstream interface ports to cause the one or more upstream interface ports to operate at the first frequency, provide a second clock signal at a second frequency to the one or more downstream interface ports to cause the one or more downstream interface ports to operate at the second frequency, and provide a third clock signal at a third frequency to the one or more bi-directional extension ports to cause the one or more bi-directional extension ports to operate at the third frequency, wherein the first, second and third frequencies are to be different from each other.

8. The system of claim 7, wherein the first extensible memory hub further comprises:

a buffer; and logic to actively manage the buffer for data transfer between the one or more upstream interface ports and the one or more downstream interface ports.

9. The system of claim 8, wherein the logic is further to actively manage the buffer for data transfer between the one or more bi-directional extension ports, the one or more upstream interface ports, and the one or more downstream interface ports.

10. The system of claim 9, wherein the logic is further to:

chain multiple extensible memory hubs with the one or more bi-directional extension ports.

11. The system of claim 9, wherein the logic is further to:

provide dual port access to the second nonvolatile memory device with the one or more bi-directional extension ports.

12. The system of claim 7, wherein the nonvolatile memory comprises a solid state drive.

13. A method of extending memory, comprising:

providing one or more upstream interface ports to couple a first extensible memory hub to a controller;

providing one or more downstream interface ports to couple the first extensible memory hub to one or more of nonvolatile memory or another extensible memory hub;

providing one or more bi-directional extension ports to be selectively configured to operate as an output port and an input port, the one or more bi-directional extension ports further being selectively configured to couple to another extensible memory hub and a second nonvolatile memory device;

providing a first clock signal at a first frequency to the one or more upstream interface ports to cause the one or more upstream interface ports to operate at the first frequency;

providing a second clock signal at a second frequency to the one or more downstream interface ports to cause the one or more downstream interface ports to operate at the second frequency; and providing a third clock signal at a third frequency to the one or more bi-directional extension ports to cause the one or more bi-directional extension ports to operate at the third frequency, wherein the first, second and third frequencies are to be different from each other.

14. The method of claim 13, further comprising:

actively managing data transfer between the one or more upstream interface ports and the one or more downstream interface ports.

15. The method of claim 14, further comprising:
actively managing data transfer between the one or more bi-directional extension ports, the one or more upstream interface ports, and the one or more downstream interface ports.

16. The method of claim 15, further comprising:
chaining multiple extensible memory hubs with the one or more bi-directional extension ports.

17. The method of claim 15, further comprising:
providing dual port access to the second nonvolatile memory device with the one or more bi-directional extension ports.

* * * * *